(12) United States Patent
Chuang et al.

(10) Patent No.: US 8,010,169 B2
(45) Date of Patent: Aug. 30, 2011

(54) HANDHELD ELECTRONIC DEVICE

(75) Inventors: I-Cheng Chuang, Tao Yuan (TW); Yu-Jing Liao, Tao Yuan (TW); Jia-Yuan Sheu, Tao Yuan (TW)

(73) Assignee: HTC Corporation, Taoyuan County (TW)

( * ) Notice: Subject to any disclaimer, the term of this patent is extended or adjusted under 35 U.S.C. 154(b) by 616 days.

(21) Appl. No.: 12/125,937

(22) Filed: May 23, 2008

(65) Prior Publication Data

US 2009/0147484 A1   Jun. 11, 2009

(30) Foreign Application Priority Data

Dec. 7, 2007   (TW) ................................ 96146917 A

(51) Int. Cl.
*H04M 1/00*   (2006.01)
(52) U.S. Cl. ............... 455/575.1; 455/575.2; 455/575.4; 379/426; 379/426.1; 379/433.12; 379/437
(58) Field of Classification Search ............... 455/575.1, 455/575.4; 379/426, 426.1, 433.12, 437, 379/440
See application file for complete search history.

(56) References Cited

U.S. PATENT DOCUMENTS

| | | | |
|---|---|---|---|
| 7,532,169 B2 * | 5/2009 | Joo et al. ........................ | 343/702 |
| 7,636,124 B2 * | 12/2009 | Yoo et al. ....................... | 348/373 |
| 7,636,592 B2 * | 12/2009 | Kim et al. .................. | 455/575.4 |
| 2009/0163257 A1 * | 6/2009 | Vesamaki et al. .......... | 455/575.4 |

* cited by examiner

*Primary Examiner* — Patrick Edouard
*Assistant Examiner* — Julio Perez
(74) *Attorney, Agent, or Firm* — Jianq Chyun IP Office

(57) ABSTRACT

A handheld electronic device including a first body, a second body, a flexible electrical connecting means and a cover is provided. The second body is slidely coupled to the first body. The flexible electrical connecting means is electrically connected between the first body and the second body and the cover is slidely coupled to the second body. The cover is located at a first position on the second body when the first body and the second body are in a stacked state. The cover shields the flexible electrical connecting means exposed due to the movement of the second body against the first body when the first body and the second body are in a spread state. Therefore, reliability and appearance of the handheld electronic device can be improved. In addition, available area on the handheld electronic device in the spread state can be increased, to provide higher design flexibility.

6 Claims, 14 Drawing Sheets

HANDHELD ELECTRONIC DEVICE

CROSS-REFERENCE TO RELATED APPLICATION

This application claims the priority benefit of Taiwan application serial no. 96146917, filed on Dec. 7, 2007. The entirety of the above-mentioned patent application is hereby incorporated by reference herein and made a part of specification.

BACKGROUND OF THE INVENTION

1. Field of the Invention

The present invention relates to a handheld electronic device. More particularly, the present invention relates to a handheld electronic device, which applies a cover to protect a flexible electrical connecting means connected between two stacked bodies.

2. Description of Related Art

A handheld electronic device is an electronic device which may be held and operated by a hand of a user, which has a relatively small size and relative lightweight for the user to carry around. Presently, mobile phones, multi-media players, personal digital assistants (PDAs), pocket computers, handheld game devices and portable satellite navigation devices are commonly used handheld electronic devices.

A common design of the handheld electronic device is a sliding handheld electronic device, which is mainly composed of two bodies respectively having a display interface and an input interface, wherein the two bodies may be slid relatively to present a stacked state or a spread state. Moreover, the sliding handheld electronic device further includes a flexible circuit board for connecting the two bodies respectively having the display interface and the input interface.

In the above handheld electronic device, since the flexible circuit board is connected between the two bodies, in case of the spread state, a part of the two bodies still maintain stacked for protecting the spread flexible circuit board. In other words, an available space on the body is limited since spread extent of a conventional handheld electronic device is limited, and therefore design of such handheld electronic device is also limited. Moreover, to further improve the spread extent of the two bodies, the flexible circuit board has to be exposed, which may influence an appearance of the handheld electronic device, and the exposed flexible circuit board may be tore during utilization, which may cause a problem of reliability.

SUMMARY OF THE INVENTION

The present invention is directed to a handheld electronic device, by which a cover is applied to shield a flexible electrical connecting means probably exposed under a spread state, so as to improve reliability and appearance of the product.

The present invention is directed to a handheld electronic device, which has a relatively large available area under a spread state, which provides higher design flexibility.

The present invention provides a handheld electronic device including a first body, a second body, a flexible electrical connecting means, and a cover. The first body has a first frame including an opening a blocking part, wherein the blocking part protrudes upwards. The second body is disposed on the first body and has a second frame. The second body may be slidely coupled to the first frame along an operating axis. The second frame has a second opening, and an exposed end of the second frame is suitable for sliding outside the first frame, such that relative position of the first body and the second body may be changed from a stacked state to a spread state. The flexible electrical connecting means penetrates the first opening of the first frame and the second opening of the second frame, and is electrically connected between the first body and the second body. The cover is slidely coupled to the second frame along the operating axis. The cover is located between the first frame and the second frame, and the cover and the exposed end of the second frame are located at a same side of the flexible electrical connecting means. Two opposite sides of the cover along the operating axis have a first protrusion and a second protrusion respectively, wherein the first protrusion is located between the second protrusion and the exposed end of the second frame, and the blocking part of the first frame is located between the first protrusion and the second protrusion. When the first body and the second body are in the stacked state, the cover is located at a first position on the second body. When the second frame is moved along the operating axis to slide the exposed end of the second frame outside the first frame, the clocking part of the first frame interferes with the second protrusion of the cover, such that the cover is moved from the first position on the second frame to a second position, so as to shield the second opening exposed due to movement of the second frame, and now the first body and the second body are in the spread state.

Accordingly, by applying the cover and the sliding mechanism therewith, the flexible electrical connecting means can be protected by the cover after the handheld electronic device is spread, and therefore the reliability and appearance of the handheld electronic device is improved. On the other hand, applying the cover also increases the available area under the spread state of the handheld electronic device, so as to provide higher design flexibility.

In order to make the aforementioned and other objects, features and advantages of the present invention comprehensible, a preferred embodiment accompanied with figures is described in detail below.

DESCRIPTION OF EMBODIMENTS

Figure 1A:
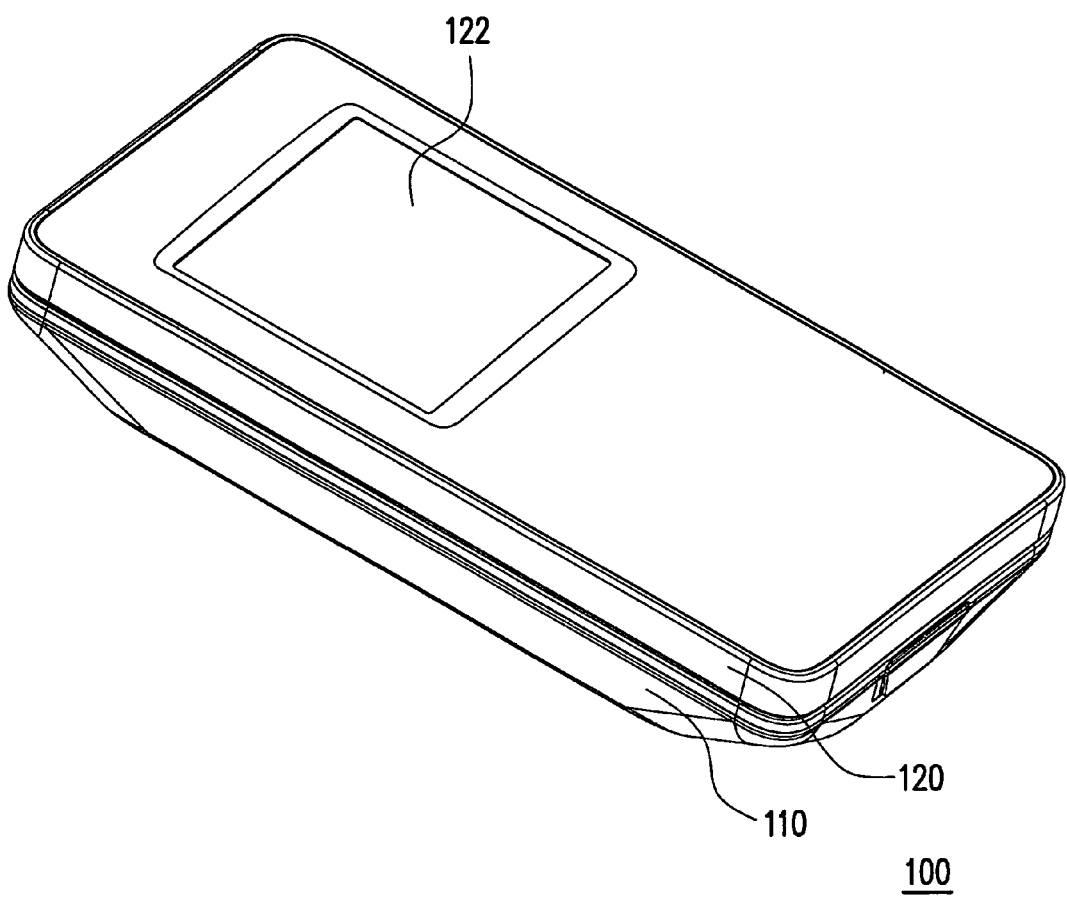
FIGS. 1A and 1B are schematic diagrams illustrating a handheld electronic device according to an embodiment of the present invention.
Figure 1B:
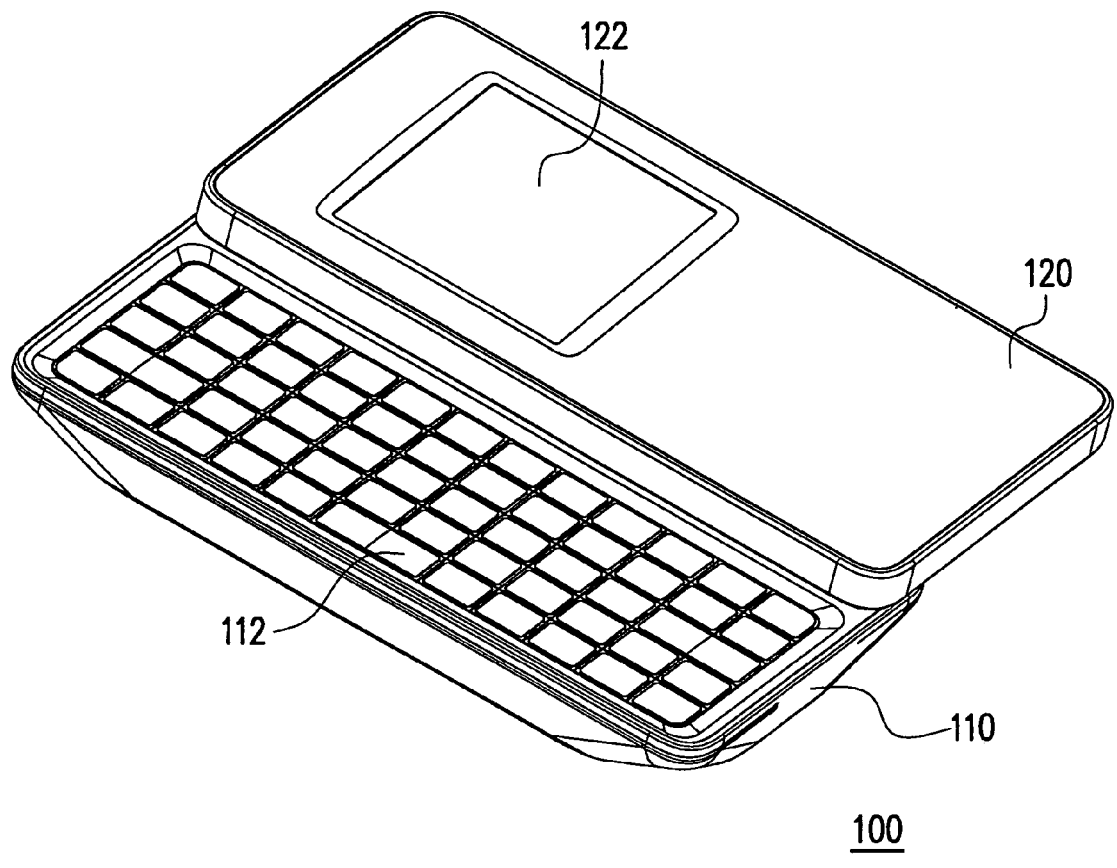

FIG. 1A and FIG. 1B are schematic diagrams illustrating a handheld electronic device according to an embodiment of the present invention. Referring to FIG. 1A and FIG. 1B, the handheld electronic device 100 may be an ultra mobile personal computer (UMPC), a tablet PC, a pocket PC, a PDA or a mobile phone etc. In detail, the handheld electronic device 100 includes a first body 110 and a second body 120. The second body 120 is slidely coupled to the first body 110, and can move relatively to the first body 110. In the present embodiment, the first body 110 has an input interface 112, for example a keyboard, and the second body 120 has a display interface 122, for example a display screen.

Referring to FIG. 1A and FIG. 1B, the second body 120 may be slid relatively to the first body 110 from a first position shown in FIG. 1A to a second position shown in FIG. 1B. When the second body 120 is slid to the first position shown in FIG. 1A, the handheld electronic device is in a stacked state, and the input interface 112 on the first body 110 is covered by the second body 120. Moreover, when the second body 120 is slid to the second position shown in FIG. 1B, the handheld electronic device is in a spread state, the input interface 112 is exposed outside the second body 120, and the input interface 112 and the display interface face towards a same direction. Therefore, a user may operate the handheld electronic device 100 via the input interface 112 and the display interface 122. In the present embodiment, the first body 110 and the second body 120 may be slid relatively along an X-axis, and hereby the handheld electronic device 100 may be referred to as a side-slide electronic device. However, in another embodiment, the first body 110 and the second body 120 may be slid relatively along a Y-axis, and hereby the handheld electronic device 100 may be referred to as a pull-down electronic device.

To further improve a spread extent between the first body 110 and the second body 120, and to shield devices probably exposed when the first body 110 and the second body 120 are further spread, a cover is applied to the sliding mechanism of the handheld electronic device 100. The cover can completely protect and shield the devices probably exposed during operation of the handheld electronic device 100, such that reliability and appearance of the handheld electronic device 100 may be improved. Moreover, since the spread extent between the first body 110 and the second body 120 is relatively great, the input interface 112 may apply a keyboard with five key rows, so as to improve an operation convenience.

The aforementioned handheld electronic device will be described in detail below with reference of figures, and for convenience, like reference numerals of the figures represent like elements as that shown in FIG. 1A and FIG. 1B.

Figure 2A:
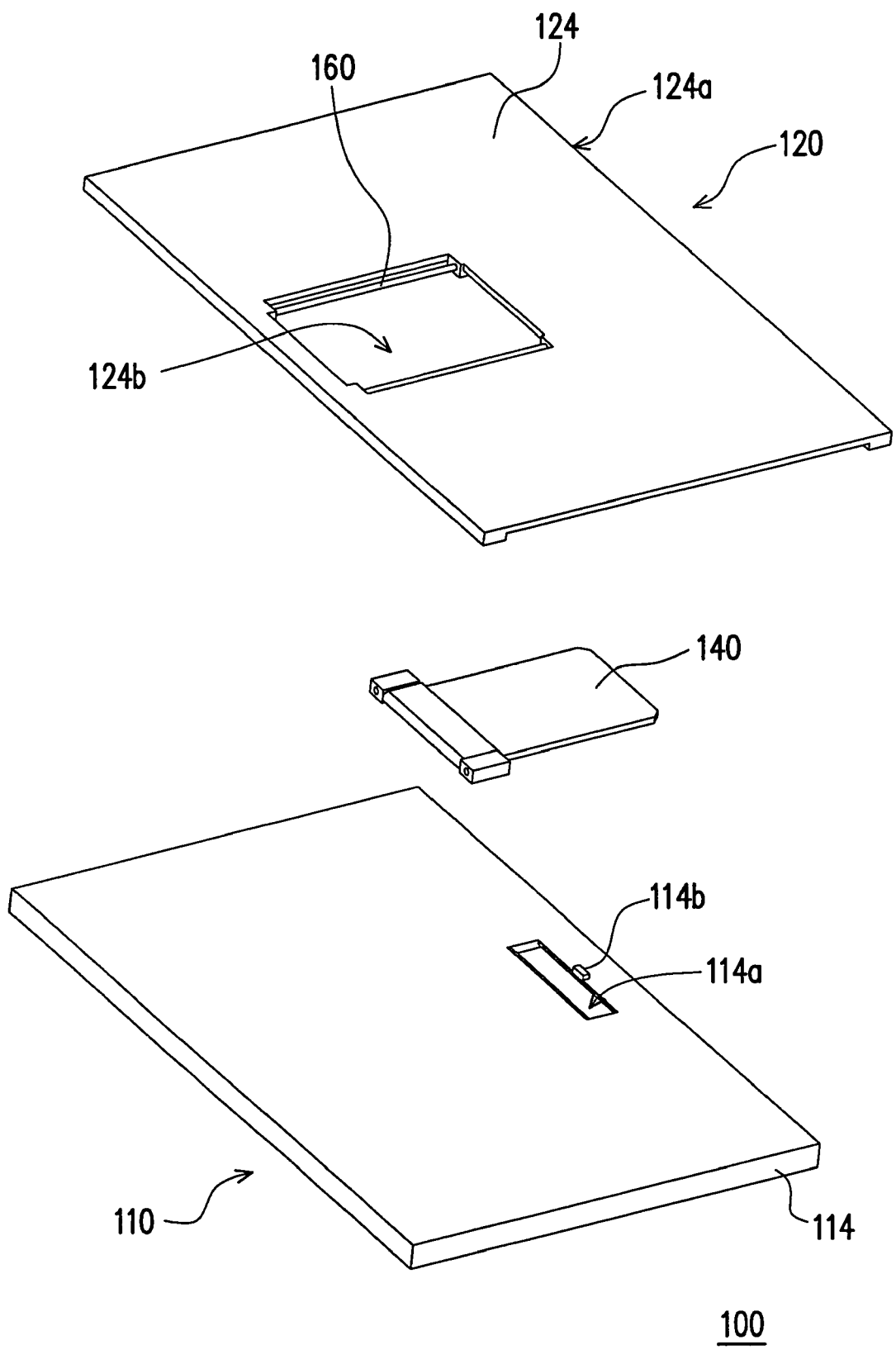
FIGS. 2A and 2B are respectively an exploded drawing and an assembly drawing of a handheld electronic device according to an embodiment of the present invention.
Figure 2B:
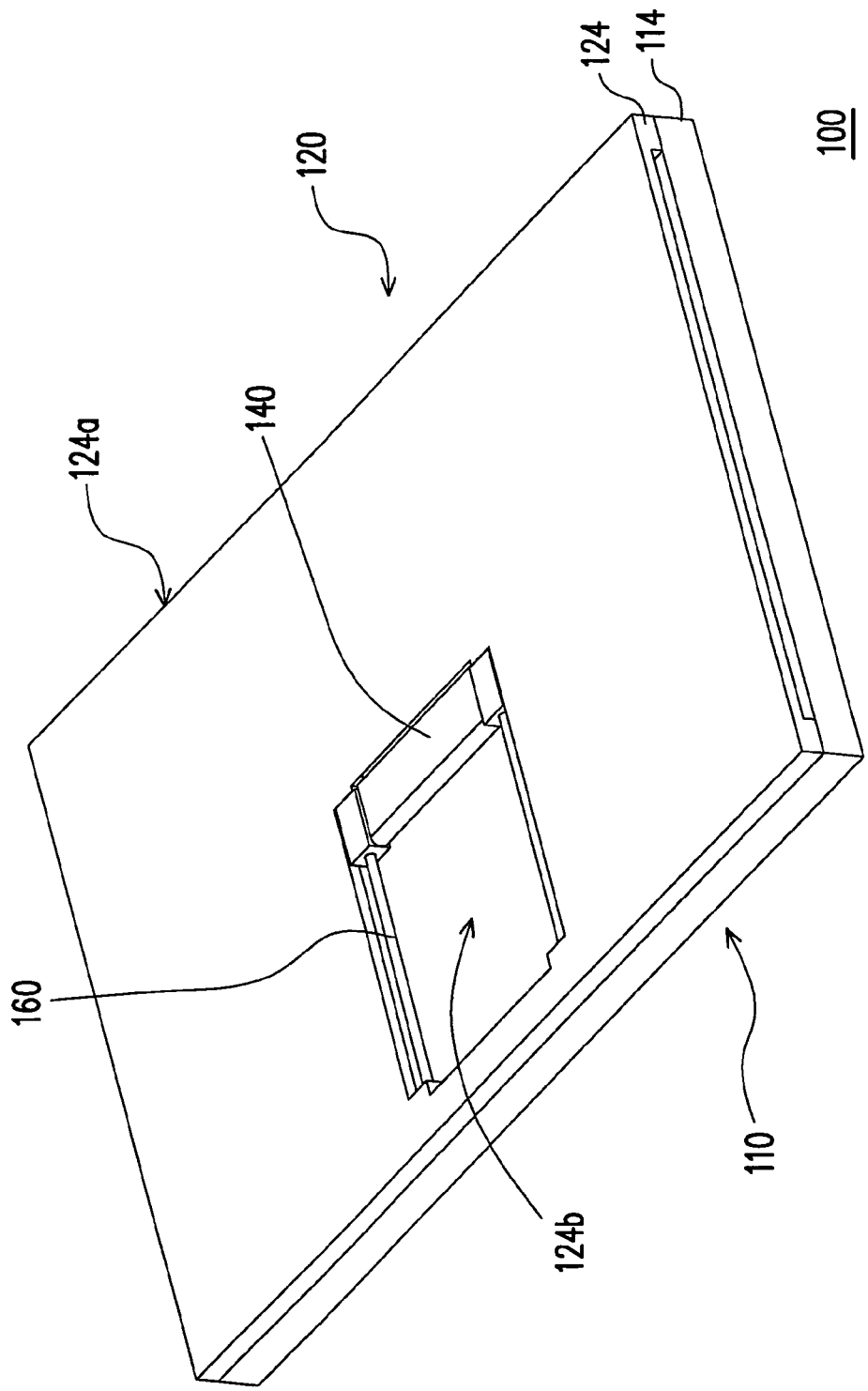

FIG. 2A and FIG. 2B are respectively an exploded drawing and an assembly drawing of a handheld electronic device according to an embodiment of the present invention. To clearly illustrate relative positions of different elements, a part of the elements are omitted in FIG. 2. Moreover, also a part of the elements are omitted in FIGS. 3A~3E, which sequentially illustrate an operation process of the handheld electronic device from a stacked state to a spread state. Furthermore, perspective views of the related elements are presented in FIGS. 3A~3E to clearly illustrate the operation process between the first body and the second body. FIGS. 4A~4E are cross-sectional views of FIGS. 3A~3E, in which the omitted elements of FIG. 2 and FIGS. 3A~3E are illustrated.

Referring to FIG. 2, FIGS. 3A~3E, and FIGS. 4A~4E, the first body 110 has a first frame 114, and the first frame 114 has a first opening 114a and a blocking part 114b, wherein the block part 114b faces to the second body 120, i.e. protrudes upwards in the figures. The second body 120 is disposed upon the first body 110, and the second body 120 has a second frame 124 slidely coupled to the first frame 114 along an operating axis X. Moreover, the second frame 124 has a second opening 124b, and an exposed end 124a of the second frame 124 is suitable for sliding outside the first frame 114.

As shown in FIGS. 4A~4E, the first body 110 further includes the input interface 112 and a control circuit (not shown), and the second body 120 further includes the display interface 122. When the user needs to operate the input interface 112 located on the first body 110, the second body 120 may be pushed along the operating axis X, so that the exposed end 124a may be slid outside the first frame 114. By which, relative position of the first body 110 and the second body 120 is sequentially changed from the stacked state shown as FIG. 3A and FIG. 4A, via states shown as FIGS. 3B~3D and FIGS. 4B~4D, and finally to the spread state shown as FIG. 3E and FIG. 4E, so as to expose the input interface 112 outside the second body 120 for utilization.

Referring to FIGS. 4A~4E again, the handheld electronic device 100 may further include a flexible electrical connecting means 130 penetrating through the first opening 114a of the first frame 114 and the second opening 124b of the second frame 124 and electrically connected between the first body 110 and the second body 120. In the present embodiment, the flexible electrical connecting means 130 may be a flexible circuit board shown as dotted lines in FIGS. 4A~4E. In detail, the flexible electrical connecting means 130 may be electrically connected between the control circuit (not shown) of the first body 110 and the display interface 122 of the second body 120.

In addition, referring to FIGS. 3A~3E and FIGS. 4A~4E again, the handheld electronic device 100 further includes a cover 140. The cover 140 is slidely coupled to the second frame 124 along the operating axis X, and is located between the first frame 114 and the second frame 124. The cover 140 and the exposed end 124a of the second frame 124 are located at a same side of the flexible electrical connecting means 130. Moreover, the cover 140 has a first protrusion 142 and a second protrusion 144 respectively facing to the first body 110 and respectively located at two opposite sides of the cover 140 along the operating axis X, wherein the first protrusion 142 is located between the second protrusion 144 and the exposed end 124a of the second frame 124, and the blocking part 114b of the first frame 114 is located between the first protrusion 142 and the second protrusion 144.

In the present embodiment, the first protrusion 142 and the second protrusion 144 of the cover 140 may be formed by a bending part at the edge of the cover 140. Moreover, the second frame 124 may further comprise at least one guiding rod 160 disposed within the second opening 124b, and an end of the cover 140 is slidely disposed on the guiding rod 160, wherein the longitudinal direction of the guiding rod 160 is parallel to the operating axis X, so that the cover 140 may smoothly slide relatively to the second frame 124 along the operating axis X.

Figure 3A:
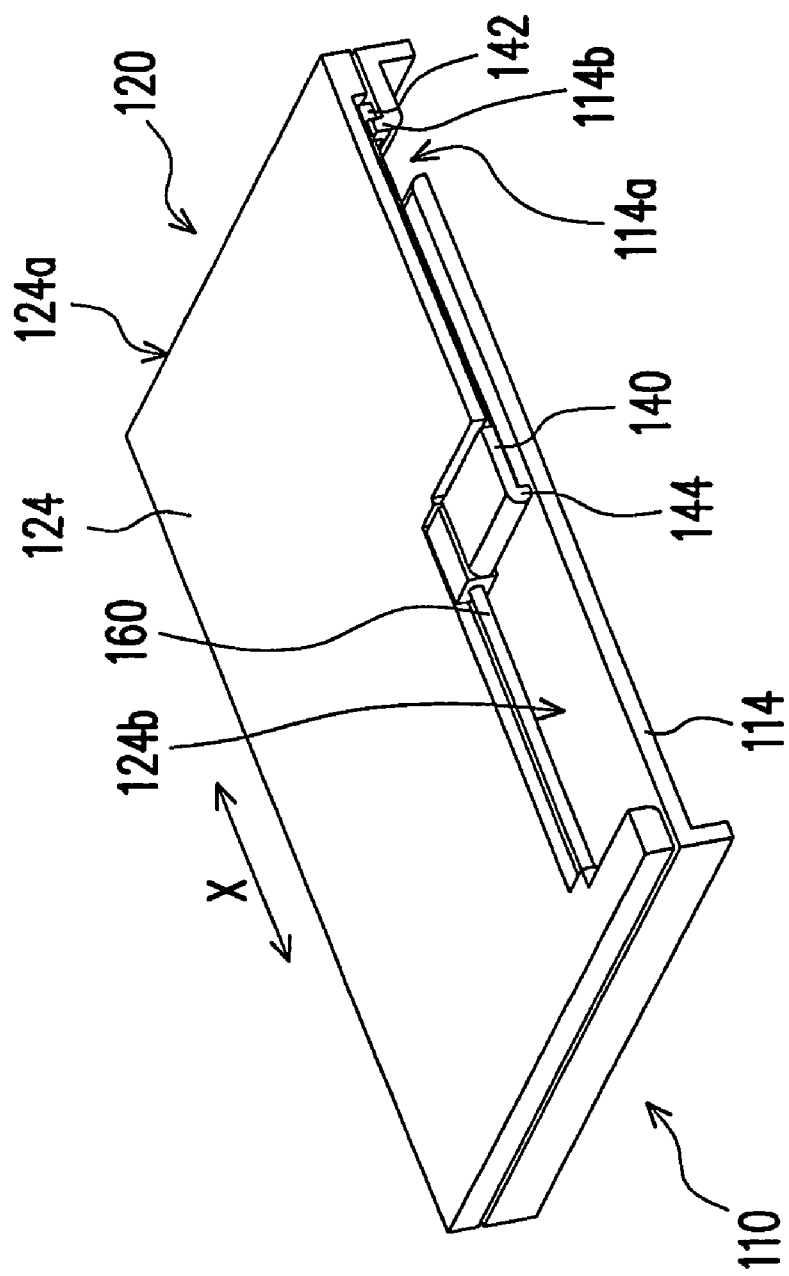
FIGS. 3A~3E are diagrams sequentially illustrating an operation process as a handheld electronic device being changed from a stacked state to a spread state.
Figure 3B:
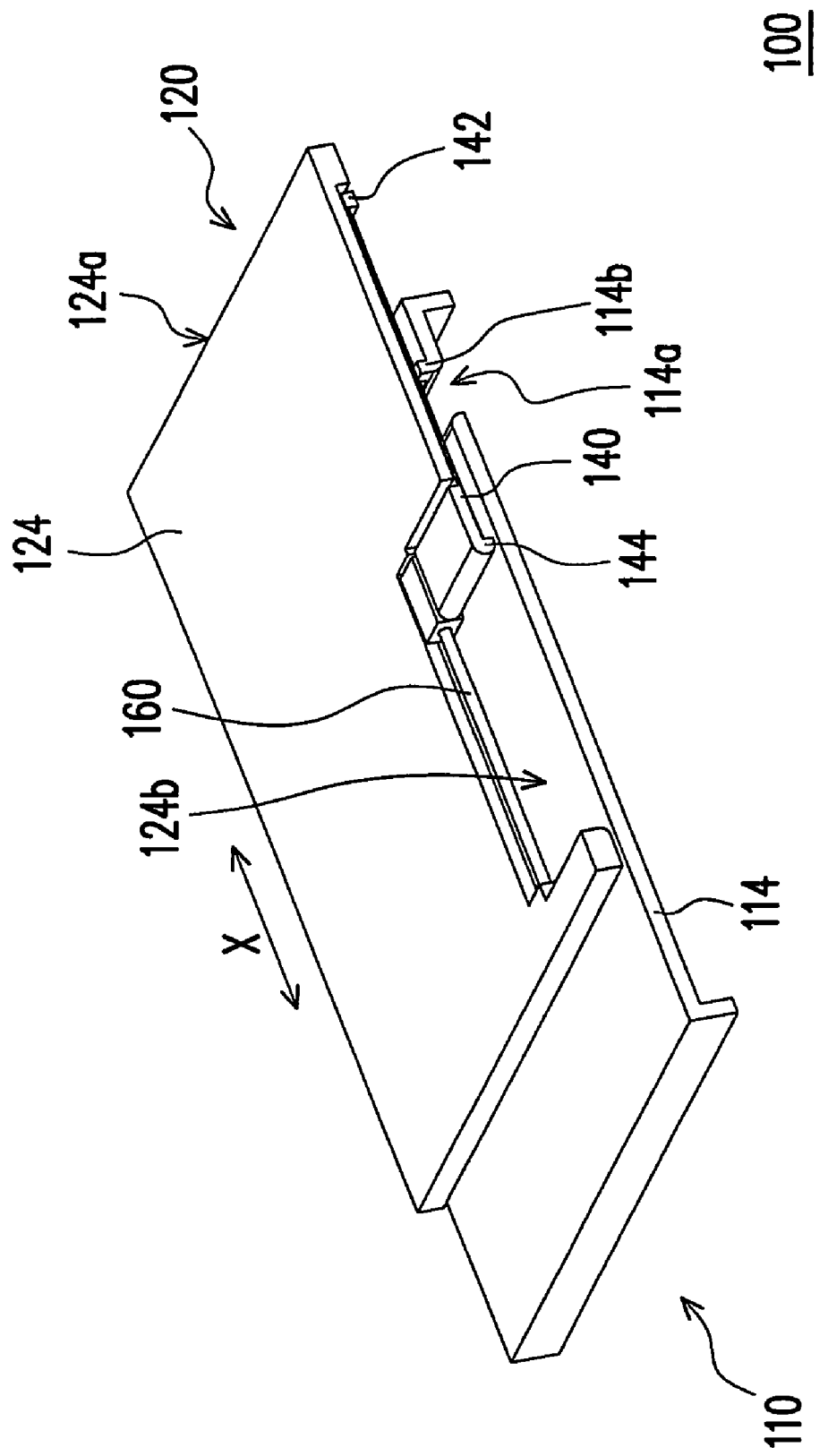
Figure 3C:
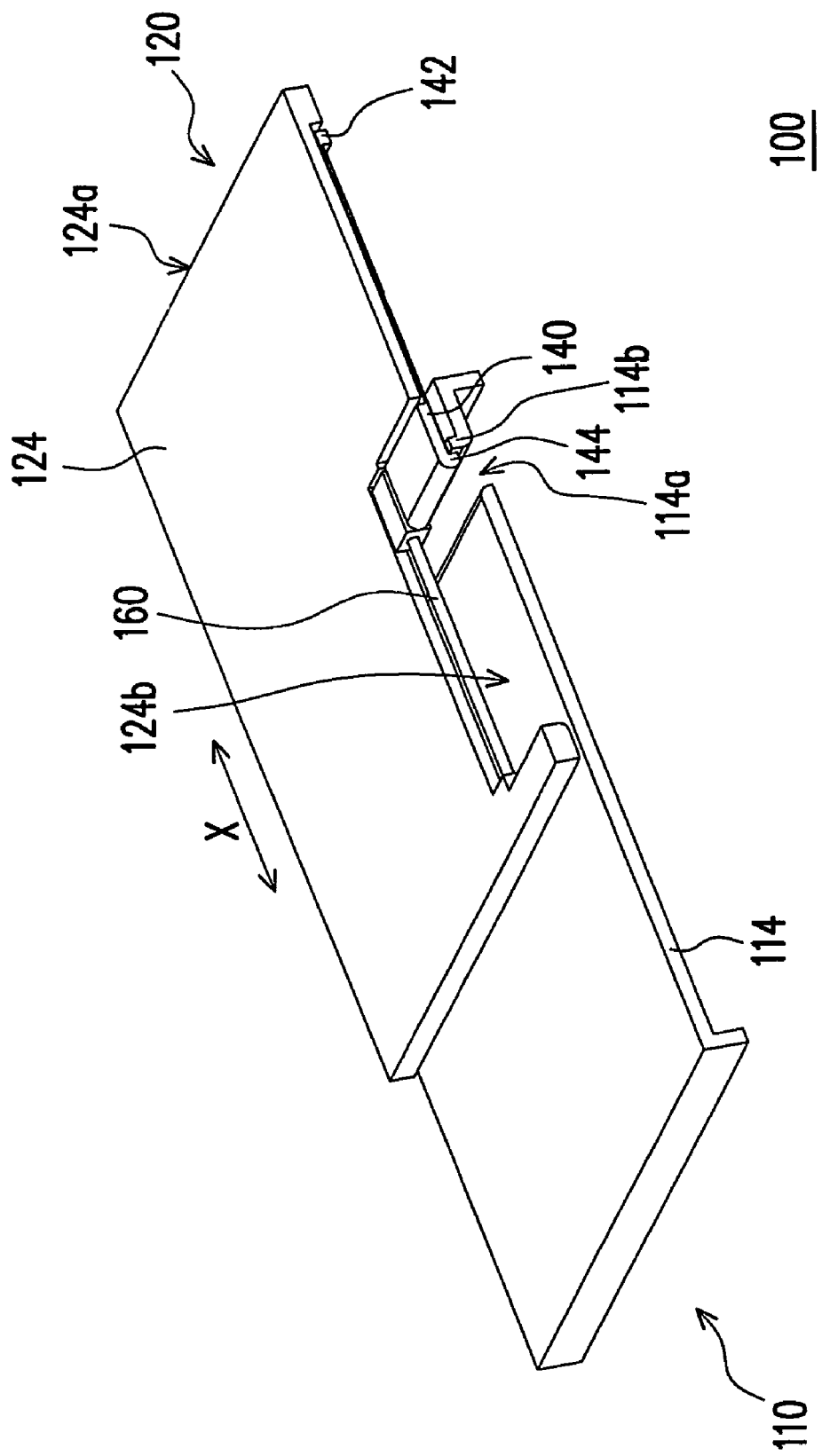
Figure 3D:
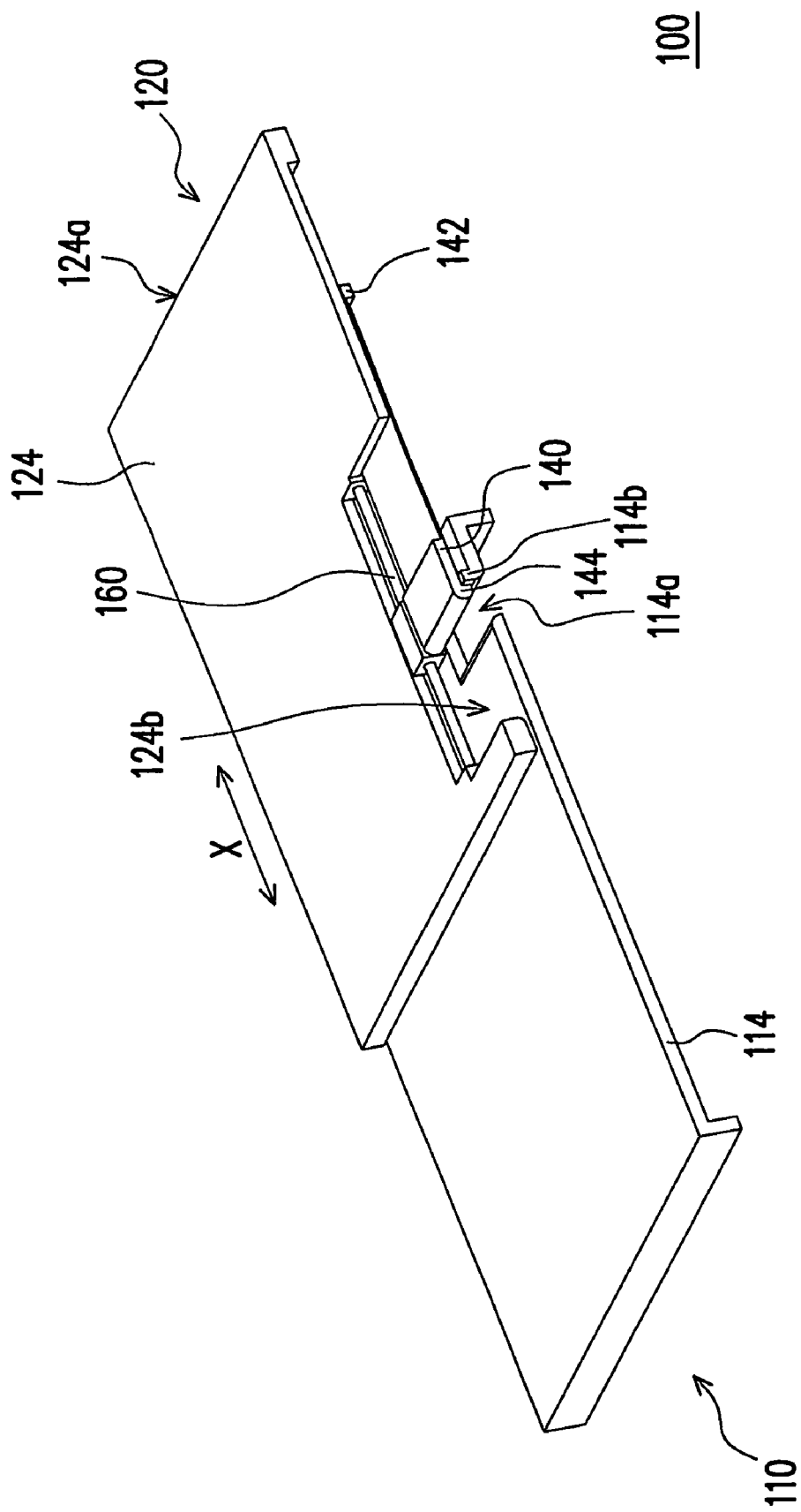
Figure 3E:
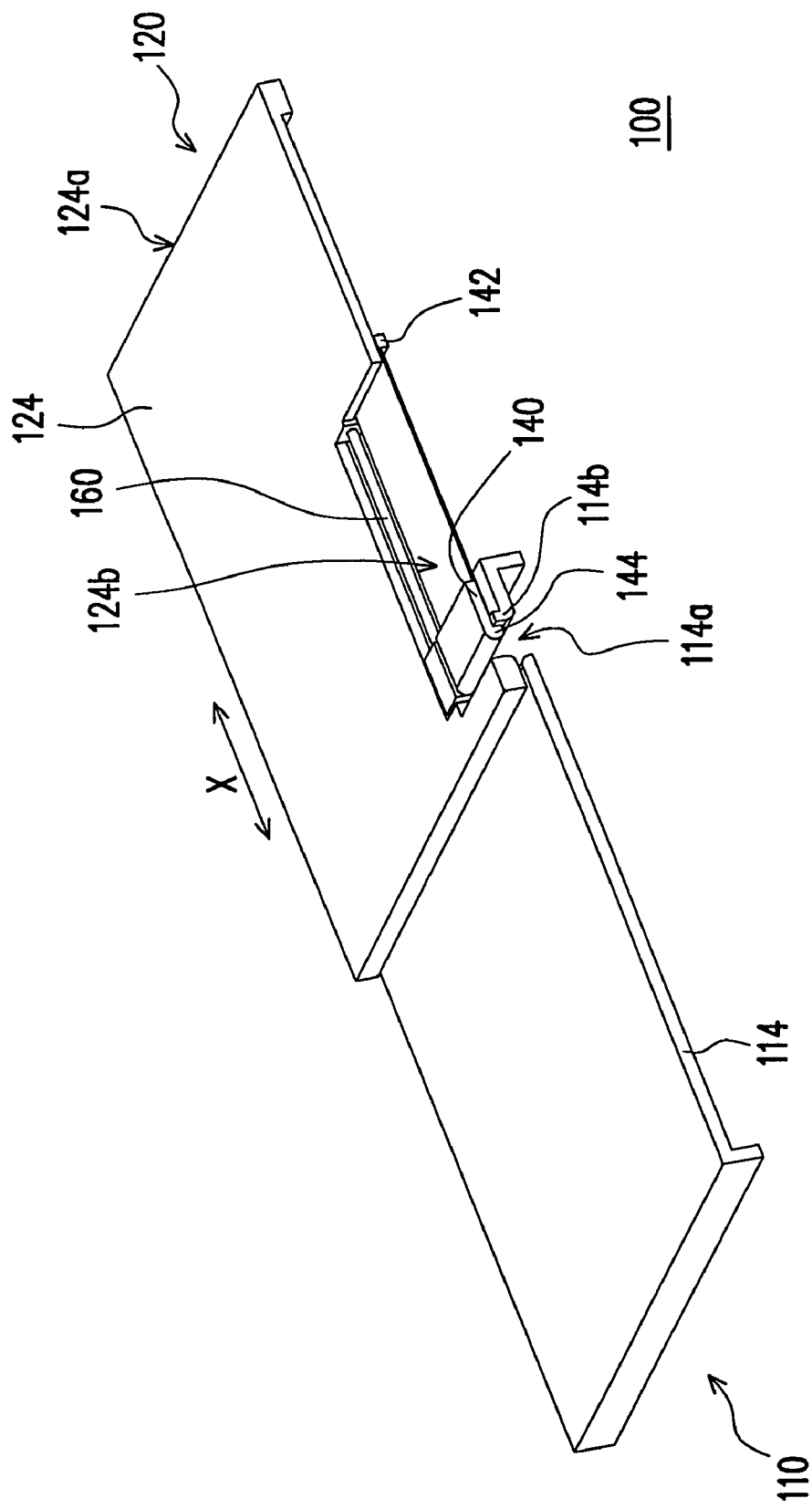
Figure 4A:
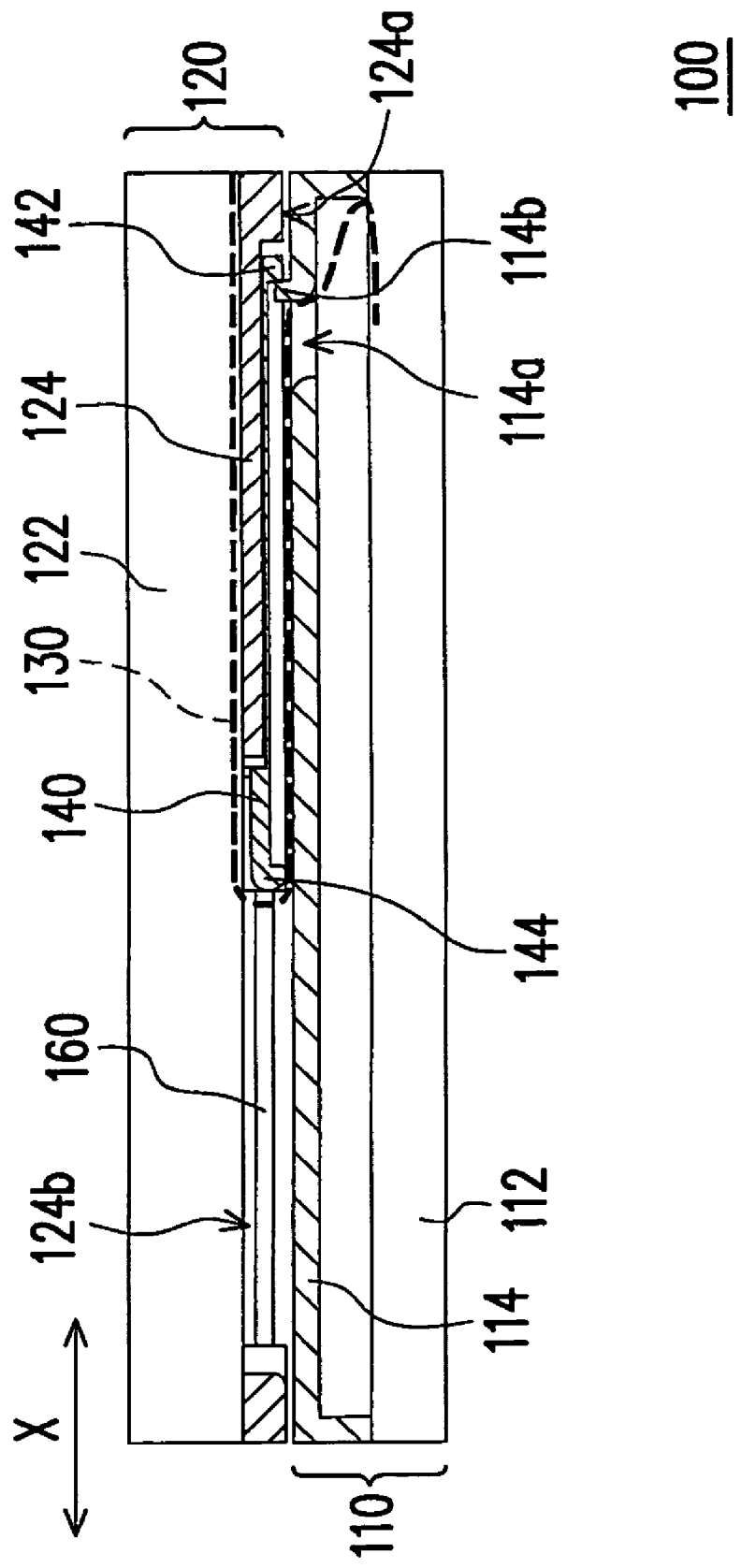
FIGS. 4A~4E are cross-sectional views of FIGS. 3A~3E.
Figure 4B:
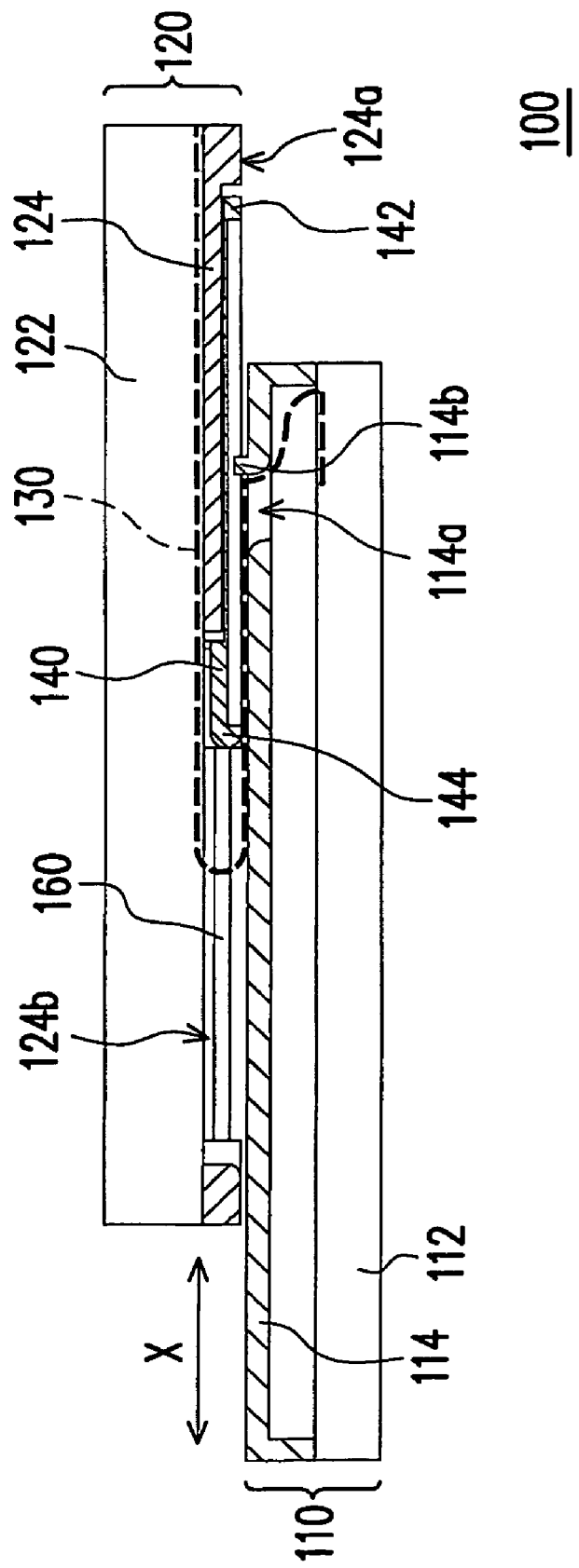
Figure 4C:
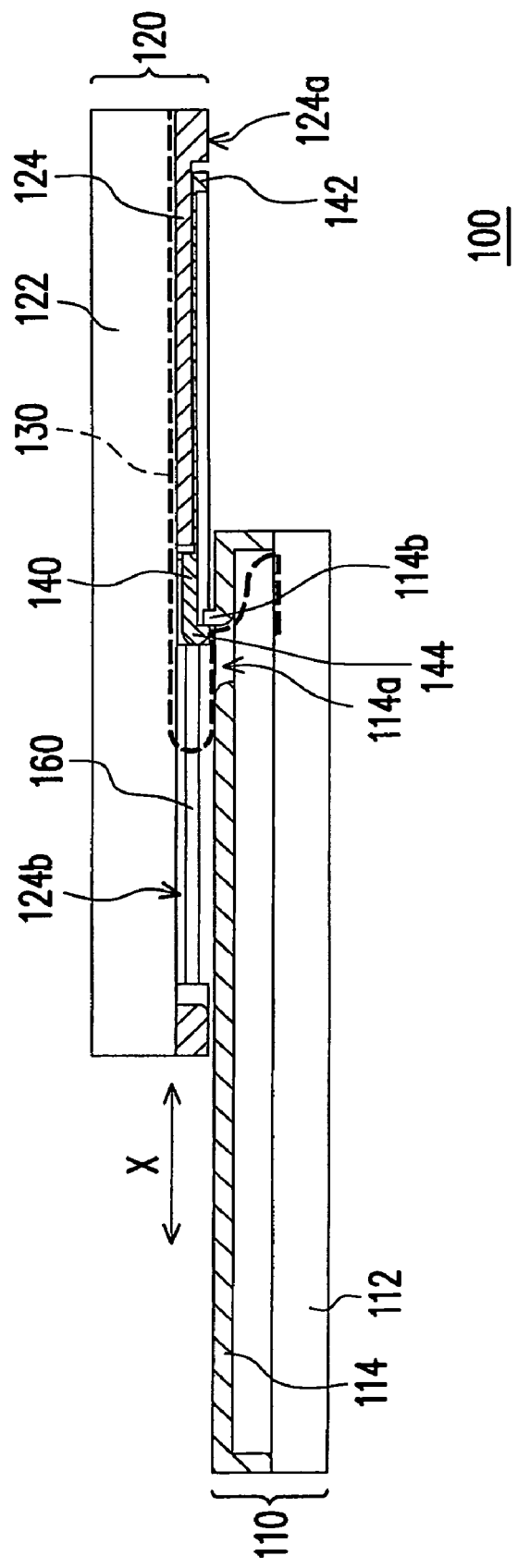
Figure 4D:
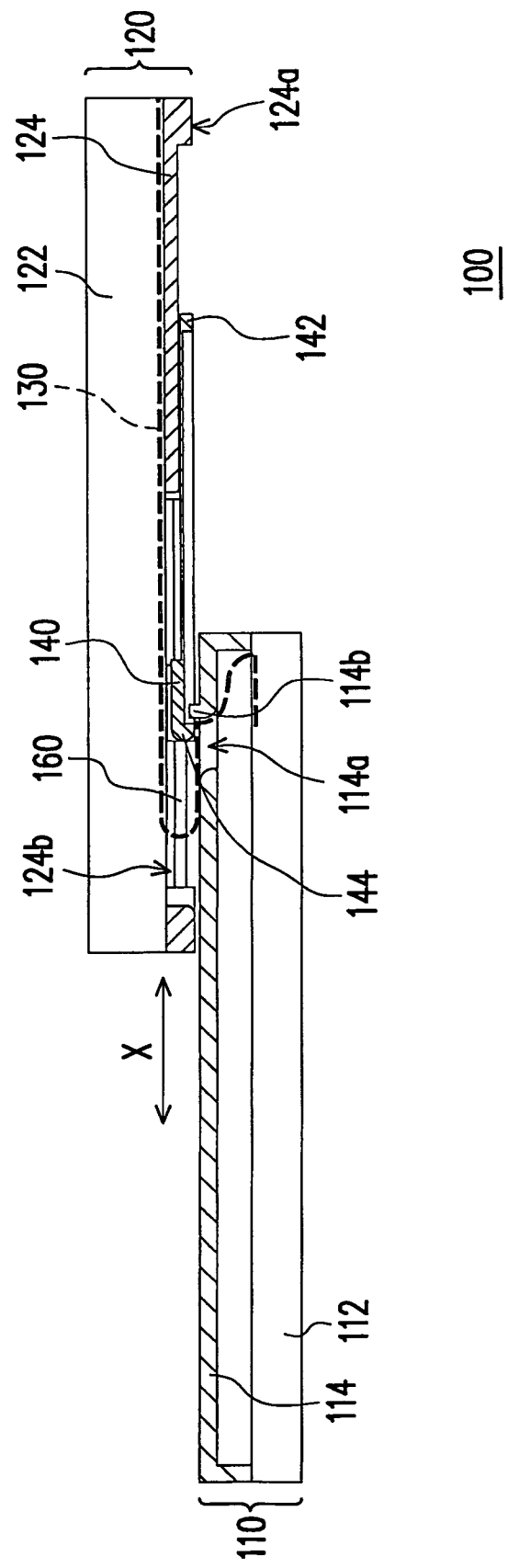
Figure 4E:
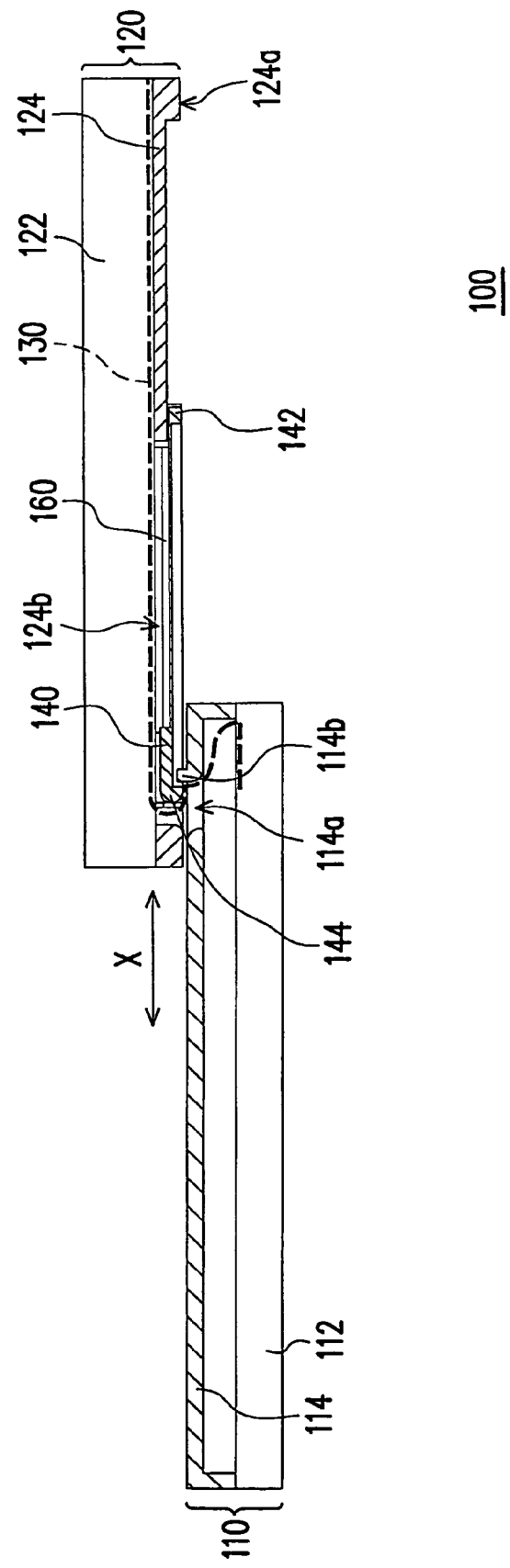

When the first body 110 and the second body 120 are in the stacked state, the cover 140 is located at the first position on the second frame 124, and when the second frame 124 is moved along the operating axis X to slide the exposed end 124a of the second frame 124 outside the first frame 114, the blocking part 114b of the first frame 114 interferes with the second protrusion 144 of the cover 140, such that the cover 140 is moved from the first position as shown in FIG. 2A and FIG. 3A to the second position as shown in FIG. 2E and FIG. 3E, so as to shield the second opening 124b exposed due to movement of the second frame 124, and now the first body 110 and the second body 120 are in the spread state.

Certainly, structures such as the blocking part 114b of the first frame 114, the guiding rod 160 of the second frame 124, and the first protrusion 142 and the second protrusion 144 of the cover 140 mentioned in the aforementioned embodiment are only used for an example, and are not used for limiting the present invention. In other possible embodiments, structures capable of fulfilling a similar effect may also be applied to the first body 110, the second body 120 and the cover 140. It should be understood by those skilled in the art that various changes may be made to the related elements with reference of the aforementioned embodiment without departing from the spirit and scope of the present invention, so as to cope with an actual requirement.

In addition, the operation process shown in FIGS. 3A~3E and FIGS. 4A~4E is reversible. In other words, by sequentially performing the steps shown as FIGS. 3A~3E and FIGS. 4A~4E, the handheld electronic device 100 is changed from the stacked state to the spread state; and if the above steps are performed reversibly, namely, the steps are sequentially performed according to a sequence of FIGS. 3E~3A and FIGS. 4E~4A, the handheld electronic device 100 is then changed from the spread state to the stacked state and the cover 140 is retrieved by the interference between the blocking part 114b and the first protrusion 142. Since the steps thereof are similar, detailed description thereof will not be repeated.

In summary, the cover of the handheld electronic device of the present invention can shield the probably exposed flexible electrical connecting means when the handheld electronic device is in the spread state, so as to provide a perfect protection for the flexible electrical connecting means and avail an improvement of the reliability and appearance of the handheld electronic device. On the other hand, since the cover provides a shielding effect for the flexible electrical connecting means, exposing of the flexible electrical connecting means due to excessive spread of the handheld electronic device is avoided, such that not only available area of the handheld electronic device is increase, but higher design flexibility is also provided. For example, since the spread extent between the first body and the second body is relatively great, the handheld electronic device may apply a keyboard with five key rows as the input interface thereof, so as to improve an operation convenience.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A handheld electronic device, comprising:
a first body, having a first frame, the first frame having a first opening and a blocking part, wherein the blocking part protrudes upwards;
a second body, disposed on the first body, the second body having a second frame slidely coupled to the first frame along an operating axis, wherein the second frame has a second opening, and an exposed end of the second frame is suitable for sliding outside the first frame, so as to change the first body and the second body from a stacked state to a spread state;
a flexible electrical connecting means, penetrating through the first opening of the first frame and the second opening of the second frame, and electrically connected between the first body and the second body; and
a cover, slidely coupled to the second frame along the operating axis, and located between the first frame and the second frame, the cover and the exposed end of the second frame being located at a same side of the flexible electrical connecting means, wherein two opposite sides of the cover along the operating axis have a first protrusion and a second protrusion respectively, the first protrusion being located between the second protrusion and the exposed end of the second frame, and the blocking part of the first frame being located between the first protrusion and the second protrusion,
wherein when the first body and the second body are in the stacked state, the cover is located at a first position on the second frame, and when the second frame is moved along the operating axis to slide the exposed end of the second frame outside the first frame, the blocking part of the first frame interferes with the second protrusion of the cover, such that the cover is moved from the first position on the second frame to a second position, so as to shield the second opening exposed due to movement of the second frame, and the first body and the second body are then in the spread state.

2. The handheld electronic device as claimed in claim 1, wherein the second frame further comprises at least a guiding rod disposed within the second opening, and one end of the cover is slidely disposed on the guiding rod.

3. The handheld electronic device as claimed in claim 1, wherein the first protrusion and the second protrusion of the cover are respectively formed by a bending part at edge of the cover.

4. The handheld electronic device as claimed in claim 1, wherein the flexible electrical connecting means comprises a flexible circuit board.

5. The handheld electronic device as claimed in claim 1, wherein the first body comprises an input interface.

6. The handheld electronic device as claimed in claim 1, wherein the second body comprises a display interface.

* * * * *